E. E. DAVIS.

FLUID COMPRESSOR.

APPLICATION FILED MAY 19, 1915.

Reissued July 20, 1915. 13,949.

WITNESSES

W. T. Hohman

William B. Wharton

INVENTOR

Elmer E. Davis,

By Frederick W. Hunter

Attorney

COLUMBIA PLANOGRAPH CO., WASHINGTON, D. C.

UNITED STATES PATENT OFFICE.

ELMER E. DAVIS, OF BUTLER, PENNSYLVANIA, ASSIGNOR TO UNION ENGINE AND MANUFACTURING COMPANY, OF BUTLER, PENNSYLVANIA, A CORPORATION OF DELAWARE.

FLUID-COMPRESSOR.

13,949. Specification of Reissued Letters Patent. Reissued July 20, 1915.

Original No. 1,135,671, dated April 13, 1915, Serial No. 678,335. Application for reissue filed May 19, 1915. Serial No. 29,217.

*To all whom it may concern:*

Be it known that I, ELMER E. DAVIS, a citizen of the United States, and a resident of Butler, county of Butler, and State of Pennsylvania, have invented certain new and useful Improvements in Fluid-Compressors, of which the following is a specification.

My invention relates to improvements in fluid compressors, and has for its object the production of a fluid compressor which will be of extremely simple construction and which will be of high efficiency in operation.

Other objects will appear hereafter.

With these objects in view, my invention consists in the combinations and arrangements of parts hereinafter described and claimed.

My invention will be more readily understood by reference to the accompanying drawing forming a part of this specification, and in which—

Figure 1:
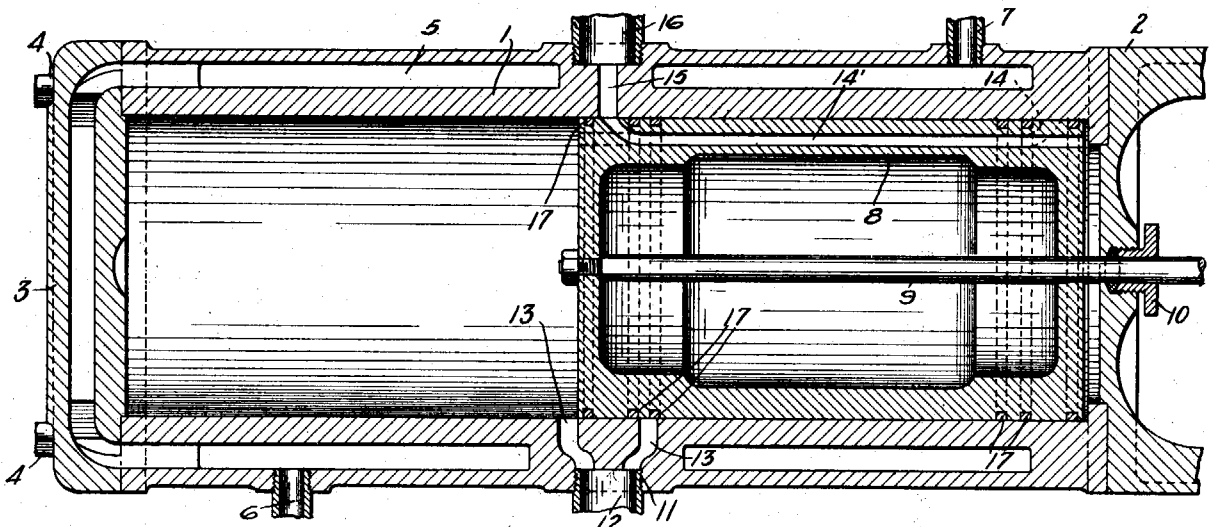
Figure 2:
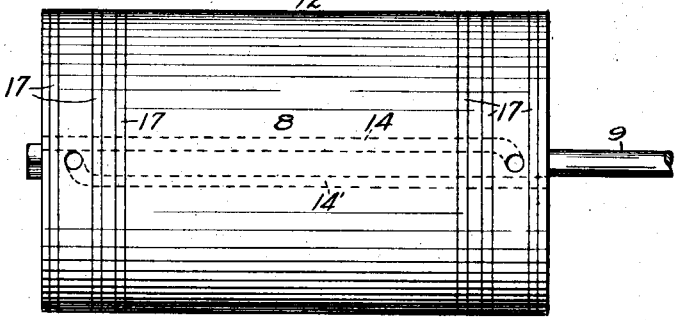

Figure 1 is a substantially central longitudinal section of a fluid compressor embodying my invention, and Fig. 2 is a side elevation of the piston of the compressor, detached.

The preferred form of construction, as illustrated in the drawing, comprises a cylinder 1 which is suitably supported upon a supporting device 2, the latter serving also as one of the heads of the cylinder. The opposite end of said cylinder is closed by the head 3 which is secured in position by bolts 4 or other suitable securing devices. Formed in the lateral walls of the cylinder and in the head 3 is a cooling jacket 5 through which a cooling fluid is adapted to be circulated in order to maintain the device at a low temperature during operation thereof. An inlet pipe 6 communicates with the chamber 5 adjacent one end of the cylinder, an exhaust pipe 7 communicating with said chamber adjacent the opposite end of the cylinder, said inlet and exhaust pipes being so disposed in order to effect a thorough circulation of the cooling fluid through the chamber 5 and about the cylinder when the device is in operation.

Mounted for reciprocation within the cylinder 1 is a piston 8, the same being of hollow construction, as shown, in order to reduce the weight thereof. Said piston is connected with a piston rod 9 which projects interiorly through one end of the cylinder, suitable packing 10 being provided in order to prevent leakage around the piston rod at the point of its projection from the cylinder. In practice, the outer end of the piston rod 9 will be connected with any suitable driving means or source of energy in order to effect the reciprocation thereof and hence of the piston 8 connected therewith.

Formed in the lateral wall of the cylinder 1 medially of the extremities thereof, is an inlet opening 11 with which communicates a supply pipe 12 through which the substance or fluid to be compressed is supplied to the compressor. It is understood, however, that where simply air is the fluid which it is designed to compress, the pipe 12 may be dispensed with, the port 11 then opening directly into the atmosphere which serves as the source of supply. Leading from the opening 11 are two ports 13, the latter being so arranged that, upon reciprocation of the piston 8, the inner extremities of said ports will alternately be uncovered by the piston for communication with the respective extremities of the interior of the cylinder or with said cylinder interior at opposite sides of the piston. With this arrangement then, it will be seen that when the piston is at one terminal of its movement one extremity of the cylinder will be supplied with fluid for compression, and when said piston is at its opposite terminal of movement, the other end of said cylinder will be supplied with fluid for compression.

Formed in the lateral wall of the piston 8 are two longitudinally extending passages 14 and 14′ corresponding extremities of which communicate with or open in the respective extremities of said piston, the opposite extremities of said passages opening laterally adjacent the respective ends of said piston, as clearly shown in the drawing. Formed in the lateral wall of the cylinder 1 medially of the extremities thereof, is an exhaust port 15 adapted for registration with the laterally opening extremities of the passages 14 and 14′, said extremities of said passages being disposed, as shown in Fig. 2, so that the same lie in longitudinal alinement in order to register with said port when the piston is reciprocated. The arrangement is such that the laterally opening extremity of one of said passages will communicate with the exhaust port 15 when the piston 8 is at one of its terminals of movement, the corresponding extremity of the other of said passages communicating with said port when said piston is at the other terminal of its movement. With this arrangement it will be seen that, upon reciprocation of the piston, the opposite extremities of the cylinder or of the interior of the cylinder at the opposite sides of the piston will be alternately brought into registration with the exhaust port 15, the compressed fluid which is exhausted through the port 15 being conveyed through the pipe 16 to the location desired for utilization. Piston rings 17 are provided in the piston 8 which are adapted to serve the usual function of piston rings.

With the construction described it will be seen that, upon reciprocation of the piston 8, when the latter is at one terminal of its movement, fluid will be supplied through one of the ports 13 to one end of the cylinder. Upon operation of said piston this fluid will be compressed thereby, the compression continuing to increase until the laterally opening extremity of the passage 14 or 14′ which communicates with this extremity of the cylinder is brought into registration with the port 15, when the fluid, thus compressed, will be exhausted through said passage and port for conduction by the service pipe 16. Simultaneously with the registration of said laterally opening extremity of said passage 14 or 14′ with the exhaust port 15, the other of the supply ports 13 will be uncovered by the piston to establish communication with the other end of the cylinder, and so that while compressed fluid is being exhausted from the first mentioned end of the cylinder, fluid for compression will be supplied to the other end of said cylinder. Upon the return stroke of the cylinder the fluid last admitted will be compressed by the piston and discharged through the other of the passages 14 or 14′ when the piston reaches the other terminal of its stroke. Thus the compressor continues to operate upon reciprocation of its piston, both ends of the cylinder being alternately employed for compression, and so that the device may be designated as double acting. It will be observed, however, that in the compressor illustrated the action at one end of the cylinder is entirely independent of that at the other end of the cylinder. In other words, the compression of a charge in one end of the cylinder and the discharge of the compressed fluid from that end of the cylinder is in no way affected by the corresponding action in the opposite end of the cylinder. Consequently each end of the cylinder is in effect a single acting compressor.

The construction set forth is simple and economical. The construction is devoid of valves which obviates considerable inconvenience and trouble, as well as expense, since the valves in fluid compressors in use at the present time are the source of most of the compressor troubles and of expense in order to maintain the same in operative condition. The construction set forth may be manufactured at a low cost, and is not susceptible of readily becoming inoperative.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:—

1. A fluid compressor comprising a cylinder, and an elongated piston mounted for reciprocation therein, said cylinder being provided with means for admitting fluid thereto at the end of each stroke and a single exhaust port substantially mid-way of the length thereof, said piston having a pair of parallel ducts extending longitudinally thereof, and opening at one end through the respective ends of said piston and the opposite ends opening through the side of said piston and arranged in longitudinal alinement whereby the last said ends register with said discharge port at the end of the strokes respectively, substantially as described.

2. A fluid compressor comprising a cylinder, and a piston mounted for reciprocation therein, said cylinder being provided with a pair of valveless inlet ports adapted to admit fluid thereto at the end of each stroke and a single valveless exhaust port substantially mid-way of the length thereof, said piston having a pair of parallel ducts extending longitudinally thereof and opening at one end through the respective ends of said piston and the opposite ends opening through the side of said piston and arranged in longitudinal alinement whereby the last mentioned ends register with said discharge port at the end of the strokes respectively, substantially as described.

3. A fluid compressor comprising a cylinder, and a piston mounted for reciprocation therein, said cylinder being provided with means for admitting fluid thereto at the end of each stroke and a single exhaust port substantially mid-way of the length thereof, said piston having a pair of parallel valveless ducts extending longitudinally thereof and opening at one end through the respective ends of said piston and the opposite ends opening through the side of said piston and arranged in longitudinal alinement whereby the last said ends register with said discharge port at the end of the strokes respectively, substantially as described.

4. A fluid compressor comprising a cylinder provided with a pair of ports intermediate the ends thereof, one of said ports being the inlet and the other being the outlet, and a piston mounted to reciprocate in said cylinder and constructed at the end of one stroke to connect one end of the cylinder to the inlet port and at the end of the opposite stroke to connect the same end of the cylinder to the exhaust port.

5. A fluid compressor comprising a cylinder provided with a pair of ports intermediate the ends thereof, one of said ports being the inlet and the other the outlet, a piston arranged to reciprocate in said cylinder and arranged at the end of one stroke to connect one end of the cylinder to the inlet port, and a duct extending longitudinally of the piston and opening at one end through one end of the piston and at its opposite end through the side thereof and arranged at the end of the opposite stroke of the piston to connect the same end of the cylinder to the exhaust port.

In testimony whereof I have signed my name to this specification in the presence of two subscribing witnesses.

ELMER E. DAVIS.

Witnesses:
EMMA K. CUNNINGHAM,
WILLIAM B. WHARTON.

Copies of this patent may be obtained for five cents each, by addressing the "Commissioner of Patents, Washington, D. C."